United States Patent
Escoffier et al.

(10) Patent No.: US 11,733,074 B2
(45) Date of Patent: Aug. 22, 2023

(54) HOUSING HEAD FOR AN INSTRUMENT, COMPRISING A MOVABLE PART

(71) Applicant: ORANO DS—DÉMANTÈLEMENT ET SERVICES, Gif-sur-Yvette (FR)

(72) Inventors: Cédric Escoffier, Bagnols-sur-Ceze (FR); Damien Vial, Piolenc (FR)

(73) Assignee: ORANO DS—DÉMANTÈLEMENT ET SERVICES, Gif-sur-Yvette (FR)

( * ) Notice: Subject to any disclaimer, the term of this patent is extended or adjusted under 35 U.S.C. 154(b) by 85 days.

(21) Appl. No.: 17/595,370

(22) PCT Filed: Apr. 30, 2020

(86) PCT No.: PCT/EP2020/062135
§ 371 (c)(1),
(2) Date: Nov. 15, 2021

(87) PCT Pub. No.: WO2020/233963
PCT Pub. Date: Nov. 26, 2020

(65) Prior Publication Data
US 2022/0244080 A1 Aug. 4, 2022

(30) Foreign Application Priority Data

May 17, 2019 (FR) ..................... 1905175

(51) Int. Cl.
*G01D 11/24* (2006.01)
*F16M 11/18* (2006.01)
*G01T 1/16* (2006.01)
*G01T 7/00* (2006.01)
*G21F 3/00* (2006.01)

(52) U.S. Cl.
CPC ........... *G01D 11/245* (2013.01); *F16M 11/18* (2013.01); *G01T 1/16* (2013.01); *G01T 7/00* (2013.01); *G21F 3/00* (2013.01)

(58) Field of Classification Search
CPC ......... G01D 11/245; F16M 11/18; G01T 1/16
See application file for complete search history.

(56) References Cited

U.S. PATENT DOCUMENTS

| 4,680,470 A | 7/1987 | Heald |
| 4,692,625 A * | 9/1987 | Hanz ................. F16M 11/2092 |
| | | 250/363.08 |
| 2017/0176605 A1 | 6/2017 | Bouhnik et al. |

(Continued)

FOREIGN PATENT DOCUMENTS

DE 102009060021 A1 6/2011

OTHER PUBLICATIONS

U.S. Appl. No. 17/597,252 for Recovery Tool for Recovering a Solid Element, in Particular a Radioactive Material, Comprising a Capture Head and a Cup filed Dec. 30, 2021.

(Continued)

*Primary Examiner* — Hugh Maupin
(74) *Attorney, Agent, or Firm* — Pearne & Gordon LLP

(57) ABSTRACT

A head for housing an instrument comprises a first part and a second part which is movable relative to the first part. The first part is configured to be rigidly connected to a support mast. The second part comprises an opening which leads outside of the head and into a housing for the instrument. The housing is located inside the head.

18 Claims, 4 Drawing Sheets

(56) References Cited

U.S. PATENT DOCUMENTS

2021/0142924 A1    5/2021    Escoffier

OTHER PUBLICATIONS

International Search Report for PCT/EP2020/062135 dated Jun. 19, 2020 and translation thereof.
Written Opinion for PCT/EP2020/062135 dated Jun. 19, 2020 and translation thereof.
Search Report for French application No. FR1905175 dated Jan. 20, 2020.

* cited by examiner

HOUSING HEAD FOR AN INSTRUMENT, COMPRISING A MOVABLE PART

CROSS-REFERENCE TO RELATED APPLICATIONS

This is a National Stage of PCT international application PCT/EP2020/062135, filed on Apr. 30, 2020, which claims the priority of French Patent Application No. 1905175, filed May 17, 2019, both of which are incorporated herein by reference in their entirety.

TECHNICAL FIELD

The invention relates to an instrument housing head for work in a hostile environment unsuitable for human intervention, especially in a radioactive environment such as a nuclear fuel cycle or nuclear power generation facility, or a laboratory, reactor or research facility using nuclear materials. More specifically, it deals with detection in a radioactive environment.

The housing head makes it possible to orient the instrument in different directions and additionally to protect the instrument from effects of the ambient environment.

Background of the Invention

Existing solutions that allow an instrument to be oriented in different directions and at the same time to protect from its environment are heavy and bulky.

For example, in order to carry out accurate measurements of X and/or gamma radiation from a radioactive source in a high radiological environment, it is necessary to use collimators having known structures, attached to support poles and within which X and/or gamma radiation detectors are housed. These collimators are cylindrical in shape. Each collimator allows a detector to be radiologically insulated, while allowing detection in a radioactive environment. The use of these collimators and detectors at the end of a support pole protects the operators from radiation.

In order to be able to position as well as possible a collimator and the detector it houses relative to the source of radioactivity, the end of the support pole is equipped with a support that is orientable in different planes, which adds to the overall size and weight of the measurement equipment.

However, some small spaces are inaccessible for these collimators on the one hand, and the fields of view of the detectors, that is the solid angles of detection, that they house are limited on the other hand. It is therefore often necessary to move these collimators, which can be complex given the overall size of the zones to be investigated and which increases the risk of exposing an operator to radiation. Furthermore, it is often difficult to position the detector in the axis of the source of radioactivity to be measured, which implies a necessary processing of the measurement data obtained to correct them by calculation.

DISCLOSURE OF THE INVENTION

The invention aims at solving at least partially the problems encountered in the solutions of prior art.

In this respect, one object of the invention is a head for housing an instrument. The head is at least partially spherical. The head comprises a first part and a second part which is movable relative to the first part.

The first part comprises a body and a connecting end piece. The connecting end piece is configured to rigidly secure the first part to a support pole.

The second part comprises a spherical cap. The second part comprises a port that opens outwardly of the head and opens into a housing for the instrument. The housing is located inside the head. The second part is at least rotationally movable relative to the first part about an axis of rotation which is designed to be tilted relative to a longitudinal axis of the support pole.

The body has a sphere shape truncated by a junction surface from the second part to the first part which is substantially planar. The junction surface from the second part to the first part is tilted relative to a longitudinal axis of the support pole, and/or the longitudinal axis of the port is tilted relative to the junction surface from the second part to the first part.

By virtue of the head according to the invention, it is possible to perform work more easily in a hostile environment unsuitable for human intervention, such as a radioactive environment, while limiting mass and overall size of the equipment comprising the head and the instrument which is housed in the head and ensuring protection of the instrument with respect to the surrounding environment.

In particular, by virtue of the head, it is possible to perform work in a small or difficult to access space, reliably and with the ability to identify the working position of the instrument.

For example, the instrument allows observation operations, in which case the instrument may be a camera, distance measurement operations, in which case the instrument may be a telemeter, cutting operations, in which case the instrument may be a laser head, decontamination operations, in which case the instrument may be a laser head or a nozzle for spraying decontamination product.

The rotational movability of the second part relative to the first part increases the field of view/action of the instrument, especially as the connecting pole is likely to be translationally and/or rotationally moved by an operator, directly or remotely, by remote operation or remote handling.

The partially spherical shape of the head optimises its mass and overall size. The head has a simple geometrical shape, which makes it easier to manufacture and, if necessary, to clean and/or decontaminate.

The junction surface from the second part to the first part is substantially planar. The junction surface may be non-planar in places to limit leakage paths at the junction between the first part and the second part, thereby better protecting or insulating the instrument from the head environment. At least most of the junction surface is planar.

Due to the tilt of the junction surface relative to the longitudinal axis of the support pole, the field of view/action of the instrument is enlarged.

The invention may optionally include one or more of the following characteristics in combination or alone.

According to one feature, the first part substantially comprises one hemisphere and the second part comprises one hemisphere.

According to another feature, the connecting end piece has a cylindrical shape, the longitudinal axis of the connecting end piece preferably being designed to be parallel to the longitudinal axis of the support pole.

According to one feature, the port is delimited by a surface of revolution, preferably a cone, a cone frustrum or a straight circular cylinder.

According to one feature, the port opens into the housing substantially in the centre of the head. This tends to facilitate working with the instrument, as well as the power supply of the instrument inside the head.

According to another feature, the port constitutes the housing for the instrument. This will be, for example, any small-size instrument, usable for operations in hostile environments and unsuitable for human intervention.

According to another feature, the longitudinal axis of the port is to intersect the longitudinal axis of the support pole.

Preferably, an axis perpendicular to the junction surface is also tilted relative to the longitudinal axis of the support pole.

According to one feature, the longitudinal axis of the port is tilted relative to the junction surface by an angle which is between 25° and 155°, preferably between 25° and 85° and between 95° and 155°, most preferably substantially 25°.

According to one feature, the junction surface is tilted relative to the longitudinal axis of the support pole by an angle which is between 25° and 155°, preferably between 25° and 85° and between 95° and 155°, highly preferably substantially 25°.

According to another feature, the tilt angle of the port relative to the junction surface is substantially equal to the tilt angle of the junction surface relative to the longitudinal axis of the support pole. These tilt angles are preferably small, thereby increasing the field of view/action of the instrument, that is the solid angle of action/view of the instrument.

According to one feature, the first part and/or the second part comprises a shielding material against radioactive radiation such as X-radiation and/or gamma radiation.

According to one feature, the first part and/or the second part comprises a thermal, chemical, bacteriological, electrical and/or magnetic insulation material.

Thus, the head is adapted to the environment to ensure protection of the instrument housed therein. Thus, when the instrument housed in the head housing is a radiological radiation measurement apparatus, the port made in the second part consisting of a shielding material makes it possible to ensure collimation function and the head thereby being a collimation head.

The invention also relates to a collimator comprising a head as defined above, the head then being a collimation head which is designed to house a radioactive radiation detector.

The invention is also concerned with an apparatus comprising a head as defined above together with the support pole.

Preferably, the apparatus is a collimation apparatus, especially when the head comprises a shielding material against radioactive radiation such as X-radiation radiation and/or gamma radiation.

According to one feature, the apparatus comprises an actuator that is configured to move the second part relative to the first part.

According to one feature, the actuator comprises a drive shaft the longitudinal axis of which is to be parallel to the longitudinal axis of the support pole.

According to one feature, the actuator comprises a transmission device.

Advantageously, the transmission device comprises a first transmission element and a second transmission element.

According to one feature, the transmission device comprises an angle transmission gear, especially a bevel gear.

A bevel gear has the advantage of being reliable and robust, of having a satisfactory efficiency and reduction ratio, of being simple in structure and inexpensive.

According to one feature, the first transmission element is housed in the first part.

According to one feature, the second transmission element is rigidly integral with the second part.

The second transmission element is for example attached to the second part. Alternatively, the second transmission element is in one piece with the second part, forming part of the second part.

According to one feature, the apparatus comprises a device for controlling the position of the port relative to the longitudinal axis of the support pole.

The position control device thus enables accurate work to be performed by means of the instrument which is carried by the head, while protecting the operator from the environment in which the head is positioned.

The invention is also concerned with control equipment, that is measurement equipment and/or monitoring equipment. The control equipment comprises a head as defined above or an apparatus as defined above, especially a collimation apparatus. The control equipment also includes an instrument which is at least partially housed in the head housing. The instrument is preferably a measurement instrument.

According to one feature, the instrument comprises a detector, especially an X-radiation detector and/or a gamma ray detector.

The control equipment facilitates or even makes it possible to perform accurate (by virtue of collimation) and extensive (by virtue of scanning a significant volume of the environment to be investigated) inspection operations, especially in a radioactive environment, carried out by means of the detector and a head or an apparatus as defined above, while limiting mass and overall size of the control equipment as well as exposure of an operator to a hostile environment unsuitable for human intervention such as a radioactive environment.

According to one feature, the detector extends inside the head so that the longitudinal axis of the detector is parallel to the longitudinal axis of the support pole.

According to another feature, the control equipment comprises a power supply or signal transmission means of the detector.

According to one feature, the power supply or signal transmission means of the detector extends inside the head substantially along the longitudinal axis of the support pole.

Thus, risks of damaging a power supply or signal transmission cable of the detector during movements of the second part relative to the first part are reduced.

Finally, the invention relates to a method for manufacturing a head as defined above or an apparatus as defined above, especially a collimation apparatus. The head is made of a single material or of several materials. In the latter case, a first material is located around a second material distinct from the first material. The first material is chosen to be more mechanically resistant and to be easily decontaminatable, while the second material is chosen for its capacity to absorb radiation and to provide mechanical, radiological, thermal, chemical, bacteriological, electrical and/or magnetic insulation.

According to a preferred embodiment, the manufacturing method comprises a step of manufacturing an external skin of the head from the first material. Even more preferably, this manufacturing step is performed by additive manufacturing.

According to one feature, the second material is a shielding material against radioactive radiation, such as X-radiation and/or gamma radiation.

Preferably, the first material comprises stainless steel.

Preferably, the second material comprises lead, copper and/or tungsten.

The head has satisfactory mechanical strength and thermal resistance due to the external skin of the first material, while protecting the instrument from the surrounding radiation.

BRIEF DESCRIPTION OF THE DRAWINGS

The present invention will be better understood upon reading the description of exemplary embodiments, given purely for indicative and in no way limiting purposes, with reference to the appended drawings in which.

DETAILED DISCLOSURE OF PARTICULAR EMBODIMENTS

Figure 1:
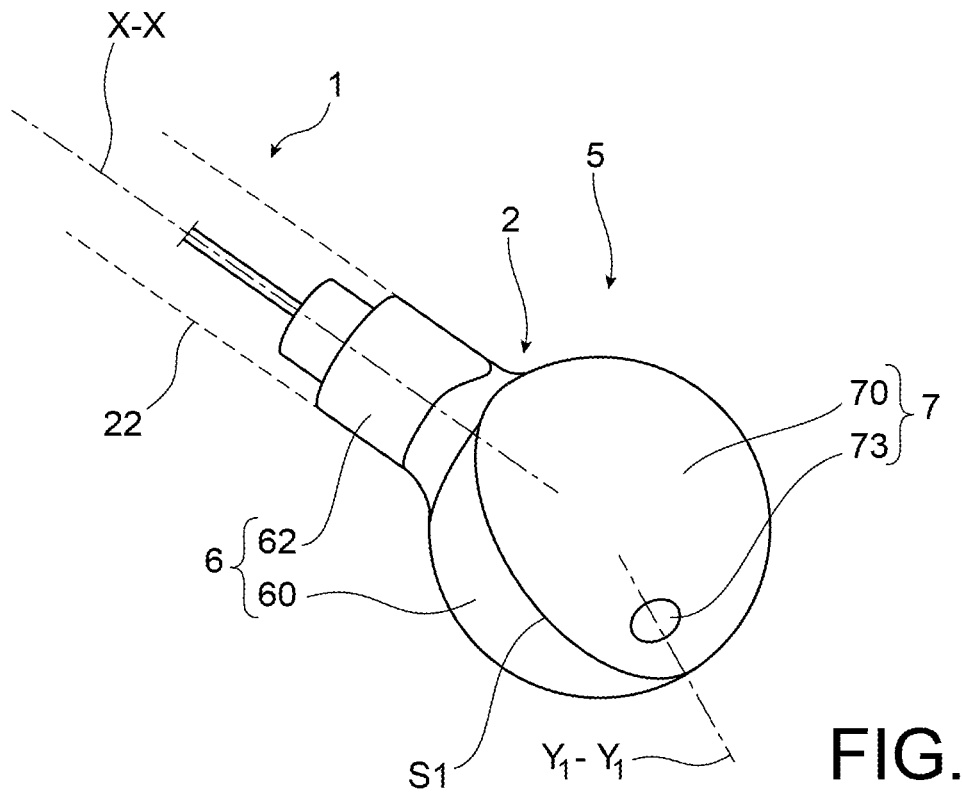
FIG. 1 is a partial schematic perspective representation of a control equipment, according to a first embodiment of the invention, in which a detection hole is oriented in a first direction.

Identical, similar or equivalent parts of the various figures bear the same reference numerals so as to facilitate switching from one figure to another.

FIGS. 1 to 6 represent a control device, in this case a measurement equipment 1, in a radioactive environment, according to a first embodiment. This radioactive environment may be, for example, a nuclear industrial facility such as a primary circuit conduit of a nuclear reactor, a storage tank for radioactive material or a storage pack for radioactive material.

The measurement equipment 1 has a longitudinal axis X-X which corresponds to a longitudinal axis of a support pole 22. An axial direction is a direction parallel to the longitudinal direction X-X of the measurement equipment 1.

The measurement equipment 1 is configured to measure X-radiation and/or gamma radiation in a radioactive environment accurately from a given radiological source, while radiologically protecting a detector 3 that is housed in a head 5 of the measurement equipment 1.

The measurement equipment 1 comprises an apparatus 2 and a detector 3. In the embodiment represented, the apparatus 2 is a collimation apparatus. The collimation apparatus 2 comprises a support pole 22, the head 5 configured to house the detector 3, and an actuator 8 which is at least partially housed inside the head 5 and at least partially inside the pole 22.

The collimation apparatus 2 further comprises a position control device (not represented) for controlling the position of a port 73 that passes through an external skin 52 of the head 5.

The support pole 22 is to be inserted into an opening in the radioactive environment. It is designed to be moved into the radioactive environment by an operator, directly or remotely, by remote operation or remote handling, while protecting the operator from radioactivity.

Figure 3:
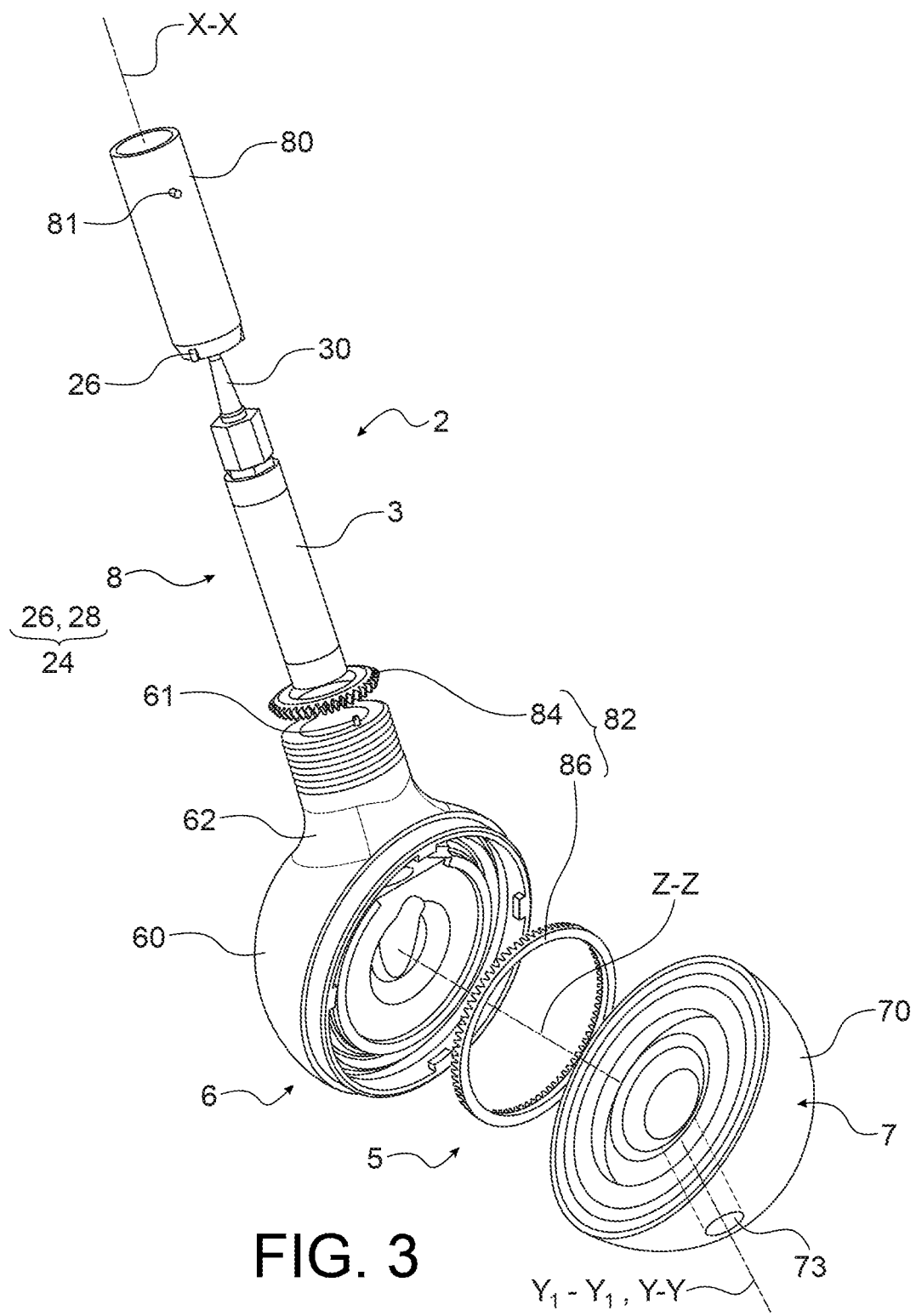
FIG. 3 is a partial schematic exploded view of the control equipment.
Figure 4:
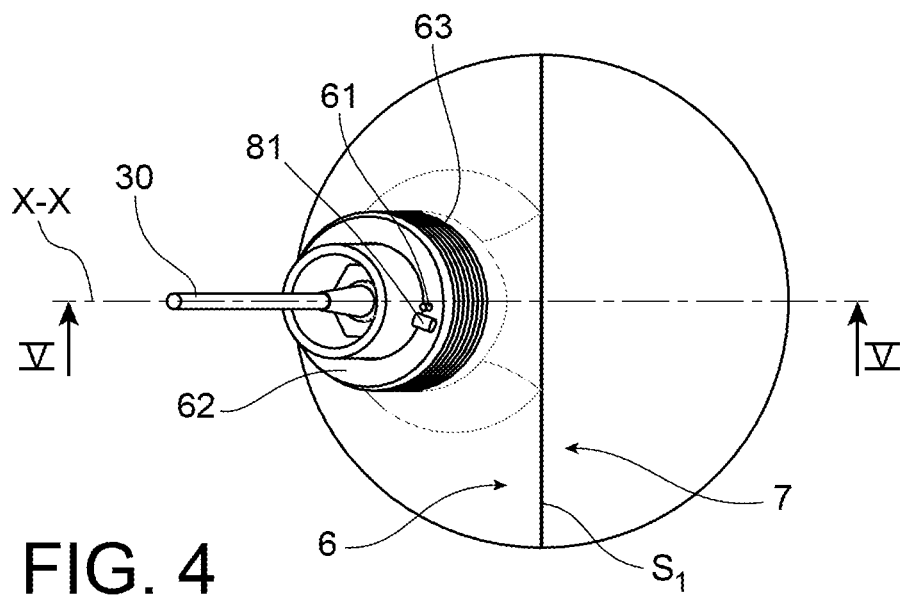
FIG. 4 is a partial schematic representation of the control equipment in a top view.
Figure 5:
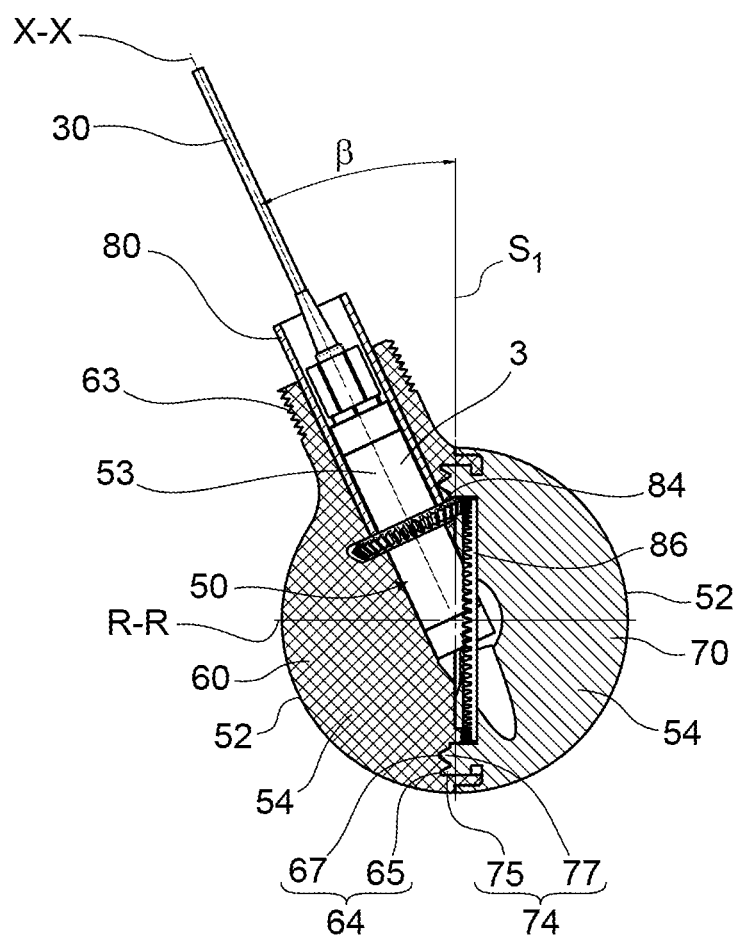
FIG. 5 is a partial schematic longitudinal cross-section representation of the control equipment.

With reference more specifically to FIGS. 3 and 5, the detector 3 forms an instrument of the equipment 1. In both exemplary embodiments represented, the detector 3 is an X-radiation and/or gamma-ray detector, for example a probe. The detector 3 may also comprise another measurement instrument, for example a telemeter, or a camera.

In general, the detector 3 is at least partially housed in a part 6 of the head 5. In the embodiments represented, the detector 3 is rigidly integral with the support pole 22. The longitudinal axis of the detector is parallel to the longitudinal axis X-X of the support pole 22.

The measurement equipment 1 comprises a power supply and signal transmission means 30 for supplying power to the detector 3 and transmitting a signal from the detector 3. This power supply and signal transmission means 30 comprises at least one electrical and/or optical cable which is housed inside the support pole 22 and inside the head 5, by being electrically/optically connected to the detector 3.

The head 5 has a partially spherical shape. It is configured to at least partially radiologically insulate the detector 3, while allowing measurement by the detector 3 of collimated radiation through the port 73.

The head 5 comprises an external skin 52 and an inner portion 54 which is surrounded by the external skin 52. The head 5 comprises a first part 6 and a second part 7 which is rotationally movable about an axis of rotation R-R relative to the first part 6. The first part 6 and the second part 7 are in mechanical contact with each other on a junction surface S1 which is substantially planar. The first part 6 and the second part 7 jointly define a housing 50 for the sensor 3 inside the head 5.

Figure 6:
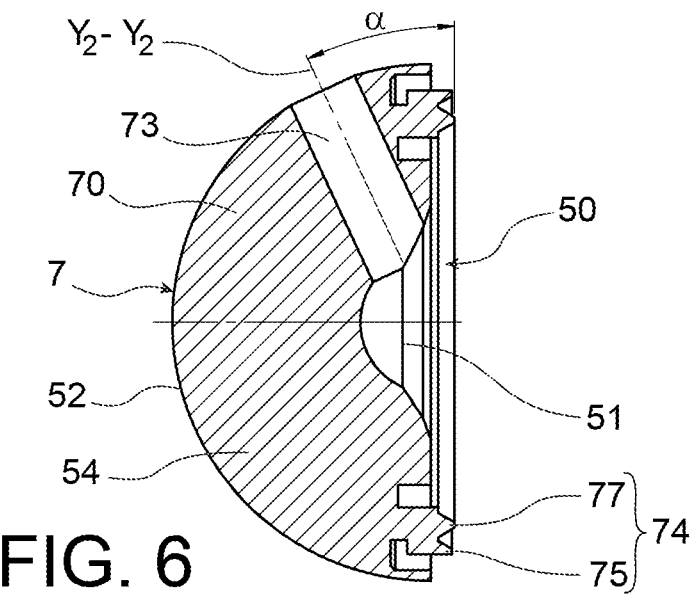
FIG. 6 is a partial schematic longitudinal cross-section representation of the second movable part of the control equipment.

With reference more specifically to FIGS. 5 and 6, the external skin 52 delimits the head 5 outwardly. It is made of a first material which has sufficient mechanical strength to limit deformation of the head 5 and which is easily decontaminatable. The first material typically comprises stainless steel.

The inner portion 54 is located inside the external skin 52. It delimits the housing 50 outwardly. It represents most of the material volume of the head 5. The inner portion 54 is made of a second material which is a radiation, typically X-radiation and/or gamma radiation, shielding material for the detector 3. The second material may be of a lower mechanical strength than the first material, but provides better radiological protection for the detector 3 than the first material. The second material comprises, for example, lead, copper and/or tungsten.

The housing 50 of the detector comprises a cylindrical portion 53 which extends along the longitudinal axis X-X of the connecting pole and a central ball-shaped cavity 51.

The cylindrical portion 53 is a straight circular cylinder the generatrix of which is parallel to the longitudinal axis X-X. It opens outwardly of the head 5 through the connecting end piece 62 for connecting the head 5 to the support pole 22. It represents most of the volume of the housing 50. The cylindrical portion 53 forms a hole for inserting the detector 3 and the power supply means 30 of the detector. It houses the power supply means 30 of the detector. It also houses most of the detector 3, along the longitudinal direction of the detector. The cylindrical portion 53 is provided in the first fixed part 6 of the head, which limits risks of damaging the power supply means 30 and to a lesser extent the detector 3, during movements of the second part 7 relative to the first part 6.

The central cavity 51 is located substantially in the centre of the partial sphere formed by the head 5. The central cavity 51 opens into the cylindrical portion 53.

With joint reference to FIGS. 1 to 6, the first part 6 is fixed with respect to the support pole 22. It comprises a body 60, a connecting end piece 62, a first guide member 64 and a first circumferential stop 61. It is made in one piece.

The connecting end piece 62 is a straight circular cylinder the generatrix of which is parallel to the longitudinal axis X-X of the support pole. It extends from the body 60 around the longitudinal axis X-X of the support pole. It is configured to rigidly secure the head 5 to the support pole 22. It comprises an outer thread 63 which is configured to mechanically engage the support pole 22, to which it is attached by clamping.

The body 60 of the first part 6 has a generally sphere shape truncated by the junction surface S1. In the embodiments represented, it has a generally hemispherical shape.

The second part 7 comprises a body 70 and a second guide member 74. A port 73 which forms a detection hole for the detector 3 passes therethrough. It is made in one piece.

The body 70 of the second part has a sphere shape truncated by the junction surface S1. The body 70 of the second part has a generally complementary shape to the body 60 of the first part, to form a sphere. In the embodiments represented, the body 70 has a hemispherical shape.

The port 73 opens through the body 70 of the second part into the housing 50 of the detector 3 and outwardly of the head 5. The port 73 opens into the housing 50 at the central cavity 51. In the embodiments represented, the port 73 has the shape of a cylinder or a straight cone with an axis Y-Y. The longitudinal axis Y-Y of the port intersects the longitudinal axis X-X of the support pole. The longitudinal axis Y-Y of the port is tilted with respect to the junction surface S1, especially by an angle α which is between 25° and 155°, preferably between 25° and 85° and between 95° and 155°. In the embodiments represented, the angle α is substantially equal to 25°.

In FIG. 1, the longitudinal axis Y-Y of the port is oriented along a first direction Y1-Y1, especially with respect to the longitudinal axis X-X of the support pole, to measure X-radiation and/or gamma radiation coming from this first direction Y1-Y1.

Figure 2:
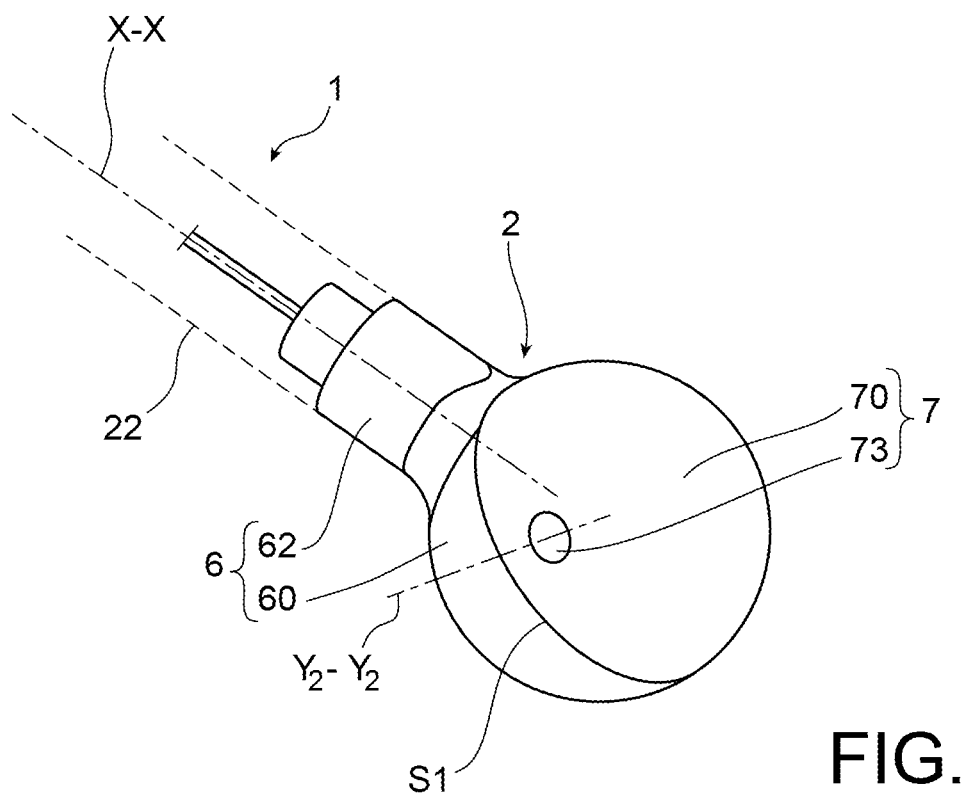
FIG. 2 is a partial schematic perspective representation of the control equipment, in which a detection hole is oriented in a second direction.

In FIG. 2, the longitudinal axis Y-Y of the port is oriented along a second direction Y2-Y2, especially with respect to the longitudinal axis X-X of the support pole, to measure X-radiation and/or gamma radiation coming from this second direction Y2-Y2.

The junction surface S1 from the second part to the first part is planar over most of its surface, except especially at the guide members 64, 74, which make it possible to limit the radiological leakage paths; it is tilted with respect to the longitudinal axis X-X of the support pole, especially by an angle β which is between 25° and 155°, preferably between 25° and 85° and between 95° and 155°. In the embodiments represented, the angle β is substantially equal to 25°.

The junction surface S1 is non-planar at the first guide member 64 and the second guide member 74, to limit the radiological leakage paths at the junction between the first part 6 and the second part 7. As a result of these discontinuities in the flatness of the junction surface S1, the detector 3 is better protected against the surrounding radioactivity, while at the same time allowing more accurate measurement of the radioactive radiation arriving through the port 73.

The axis of rotation R-R of the second part 7 relative to the first part 6 is orthogonal to the junction surface S1. It is tilted with respect to the longitudinal axis X-X of the support pole. It intersects the longitudinal axis X-X of the support pole. It passes through a diameter of the central cavity 51, which further limits risks of damaging the detector 3, during movements of the second part 7 relative to the first part 6.

The first guide member 64 and the second guide member 74 jointly form a guide member for guiding the movement of the second part 7 relative to the first part 6.

The first guide member 64 comprises a first recess 65 and a second recess 67 provided in the body 60 of the first part 6 at the junction surface S1. These recesses 65, 67 each have the shape of an annular groove about the axis of rotation R-R of the second part 7 relative to the first part 6. These annular grooves 65, 67 are radially spaced from each other relative to the axis of rotation R-R by an annular rib.

The second guide member 74 comprises a first protruding portion 75 and a second protruding portion 77 protruding from the body 70 of the second part 7 at the junction surface S1. These protruding portions 75, 77 each have an annular rib shape about the axis of rotation R-R of the second part 7 relative to the first part 6. These annular ribs 75, 77 are radially spaced from each other relative to the axis of rotation R-R by an annular groove.

The second guide member 74 is adapted to mechanically engage the first guide member 64 in a form-fitting manner at the junction surface S1. More specifically, the protruding portions 75, 77 of the second part are inserted into the recesses 65, 67 of the first part 6, allowing non-slip rotation of the second part 7 relative to the first part 6 along the junction surface S1, about the axis of rotation R-R.

The actuator 8 is configured to cause the second part 7 to move relative to the first part 6. The actuator 8 comprises a drive device and a transmission device 82.

The drive device comprises a drive shaft 80 the longitudinal axis of which is parallel to the longitudinal axis X-X of the support pole 22 in which it is at least partially housed. The drive shaft 80 is hollow, being substantially cylindrical with a circular cross-section about the longitudinal axis X-X of the support pole. The inside of the drive shaft 80 at least partially houses the detector 3. The drive shaft 80 is also at least partially housed in the connecting end piece 62. The drive shaft 80 is rotationally movable about its longitudinal axis, for example by being driven by a motor (not represented).

The transmission device 82 comprises a first transmission element 84 and a second transmission element 86. The transmission device forms an angle transmission gear, due to the tilt of the axis of rotation R-R of the second transmission element 86 relative to the axis of rotation X-X of the first transmission element 84. Since the axis of rotation R-R of the second transmission element 86 and the axis of rotation X-X of the first transmission element 84 intersect, the transmission device 82 forms a bevel gear.

The first transmission element 84 is a first toothed wheel the axis of revolution of which is parallel to the longitudinal axis X-X of the support pole 22 and of the drive shaft 80. The first transmission element 84 is housed inside the first part 6 around the detector 3. The first transmission element 84 is rotationally movable relative to the first part 6 and the detector 3. It is rotationally integral with the drive shaft 80 which movably drives it relative to the first part 6.

The second transmission element 86 is a second toothed wheel the axis of revolution of which is the axis of rotation R-R of the second part 7. The second transmission element 86 is located at the junction surface S1 which it at least partially delimits. The second transmission element 86 is movably driven by the first transmission element 84 which meshes with it, relative to the first part 6. It is rotationally integral with the body 70 of the second part. In the embodiment represented, the second transmission element 86 is rigidly integral with the body 70 of the second part, by being attached or in one piece with the body 70 of the second part 7.

The first transmission element 82 is mechanically connected to the drive shaft 80 by being rotationally integral with the drive shaft 80 by a connecting device. This connecting device comprises at least one first lug 26 and at least one second lug 28. Each first lug 26 is rigidly integral with the drive shaft 80, for example by protruding radially with respect to the longitudinal axis of the drive shaft 80. Each second lug 28 is rigidly integral with the first transmission element 84, for example by protruding axially along the longitudinal axis of the drive shaft 80. Each second lug 28 is designed to mechanically engage one of the first lugs 26 in a form-fitting manner, for example by being in rotational abutment against this first lug 26.

In the first embodiment represented, the drive shaft 80 comprises at least three first male lugs 26 which are circumferentially uniformly distributed relative to the longitudinal axis X-X of the drive shaft. The first toothed wheel comprises at least three second female lugs 28 which are circumferentially uniformly distributed relative to the longitudinal axis X-X of the drive shaft.

The drive shaft 80 and the connecting end piece 62 also include circumferential stops 61, 81, to limit rotational movement of the drive shaft 80 relative to the connecting end piece 62. The circumferential stops 61, 81 are to limit rotation of the second part 7 relative to the first part 6 about the axis of rotation R-R.

The first circumferential stop 61 protrudes from an upper rim of the connecting end piece 62 axially along the longitudinal axis X-X of the support pole. The first circumferential stop 61 has a cylindrical appendage shape.

The second circumferential stop 81 protrudes from the drive shaft 80 radially outwardly with respect to the longitudinal axis X-X of the support pole. The second circumferential stop 81 has a cylindrical appendage shape. It is configured to come into mechanical contact with the first circumferential stop 61, limiting rotational stroke of the actuator 8 relative to the first part 6.

According to a method for manufacturing the head 5, the head 5 is manufactured in several steps. First, the external skin 52 of the head is manufactured by additive manufacturing from the first material, for example by laser melting of metal powder. The external skin 52 of the first part 6 is especially manufactured independently of the external skin of the second part 7. Then, the inner portion 54 is manufactured inside the external skin 52. The inner portion 54 is, for example, produced by casting from the second material.

Figure 7:
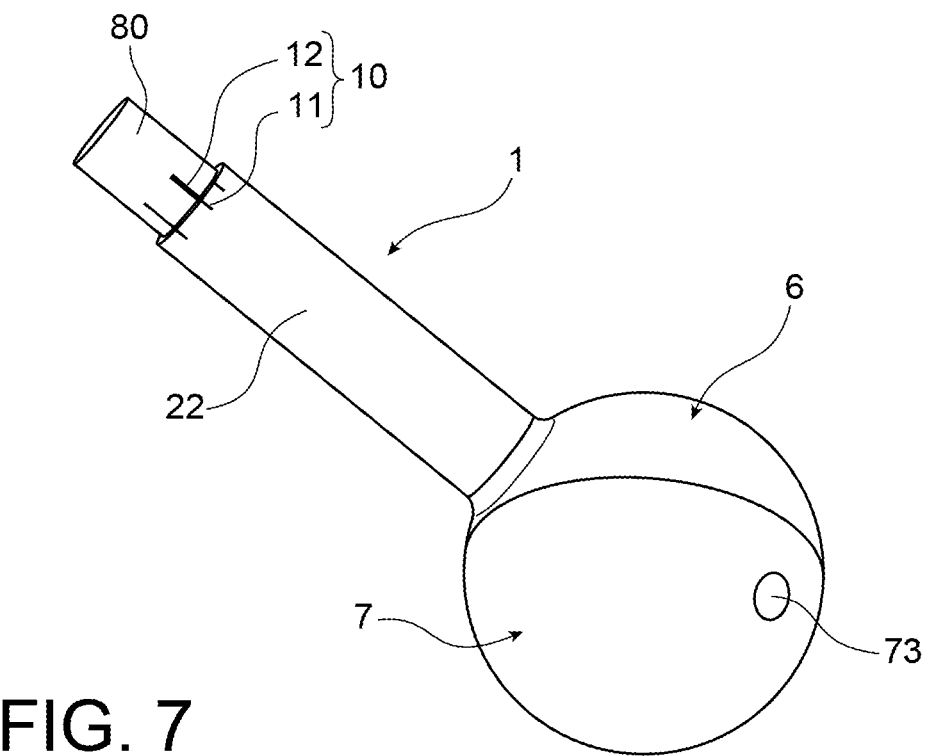
FIG. 7 is a partial schematic perspective representation of a control equipment, according to a second embodiment of the invention.

FIG. 7 represents a measurement equipment 1 according to a second embodiment. The measurement equipment 1 according to the second embodiment differs from that of the first embodiment mainly in that the support pole 22 is in one piece with the head 5 of the collimation apparatus 2. FIG. 7 also represents the control device 10 for controlling the position of the port 73 relative to the longitudinal axis X-X of the support pole, which is also usable in the first embodiment of the invention.

The control device 10 for controlling the position of the port 73 comprises a first graduation 11 which is marked on the support pole 22 and a second graduation 12 which is marked on the drive shaft 80. The first graduation 11 and second graduation 12 allow the position of the port 73 to be visually identified with respect to the longitudinal axis X-X of the support pole, given that the support pole 22 is tilted with respect to the junction surface S1.

The measurement equipment 1 according to the first embodiment or according to the second embodiment facilitates performing measurement operations in a radioactive environment, carried out by means of the detector 3 and the collimation apparatus 2, while limiting exposure of an operator to a radioactive environment, mass and overall size of the measurement equipment 1.

The rotational movability of the second part 6 relative to the first part 7 enhances the field of view of the detector 3, given that the connecting pole 22 can be translationally and/or rotatably moved by an operator or by remote operation.

The field of view of the detector 3 is enhanced by the fact that the angle β formed by the junction surface S1 with the longitudinal axis X-X of the connecting pole and the angle α between the port 73 and the junction surface S1 are small and non-zero.

The partially spherical shape of the head 5 optimises mass and overall size thereof. Furthermore, the head 5 has a simple geometric shape, which makes it easier to manufacture and decontaminate.

Because of the manufacture of the external skin 52 from the first material, the head 5 has satisfactory mechanical strength. Furthermore, the head 5 protects the detector 3 against radiation due to the inner portion 54 made of the second shielding material.

Of course, various modifications can be made by the person skilled in the art to the invention just described without departing from the scope of the disclosure.

Alternatively, the equipment 1 may be an apparatus for supporting an instrument and which is configured to at least partially protect and/or insulate the instrument 3 mechanically, radiologically, thermally, chemically, bacteriologically, electrically and/or magnetically.

Alternatively, the equipment 1 comprises an instrument 3 that is distinct from a detector, such as a sampling, cleaning and/or decontamination tool.

The instrument 3 may be housed predominantly in the second part 7, especially in the port 73. It may be attached to the second part 7, for example when the instrument 3 is a telemeter, camera and/or sampling tool.

When the equipment 1 is devoid of a radiological, electrical and/or magnetic insulation function, the head 5 of the equipment 1 is devoid of shielding material. In particular, it may be devoid of an inner portion 54 and include only an external skin 52, to limit mass and overall size of the equipment 1.

The head 5 may be of variable shapes and dimensions, in particular of a shape and dimension adapted to an opening for inserting the head 5. The head 5 is for example cylindrical instead of being partially spherical. The head 5 may be entirely or almost entirely spherical.

Alternatively, the first part 6 is hinged relative to the support pole 22, instead of being rigidly integral with the support pole 22. Various types of mechanical connections are possible between the head 5 and the support pole 22, for example by soldering, brazing, welding, elastic interlocking, etc.

The second part 7 may be movable relative to the first part 6 in a complex motion, which preferably includes at least one rotational motion. For example, the second part 7 is movable in a helical connection relative to the first part 6.

The head 5 may be manufactured without additive manufacturing, especially by casting when it is made of a single constituent material, typically the first material.

When the instrument 3 is a sampling tool, the port 73 is a sampling hole. When the instrument 3 is a cleaning and/or decontamination tool, the port 73 is a spray port.

The port 73 may have variable shapes. In particular, it may form a conical and/or frustoconical opening into the central cavity 51. The dimensions of the port 73 may vary, for example by providing interchangeable second parts 7 for a single first part 6. Complementary parts to the port 73, such as spacers, may also be inserted so as to modify shape or dimensions of the port 73.

The control device 10 for controlling the position of the port may be configured to automatically identify the relative position of the port 73 with respect to the longitudinal axis X-X of the apparatus 1. It comprises, for example, a control unit (not shown) which may be outside the head 5.

What is claimed is:

1. A head for housing an instrument, wherein the head is at least partially spherical, wherein the head comprises:
    a first part, wherein the first part comprises a body and a connecting end piece, wherein the connecting end piece is configured to rigidly secure the first part to a support pole, and
    a second part, wherein the second part comprises a spherical cap and a port opening outwardly of the head, wherein the port opens into a housing capable of housing the instrument, wherein the housing is located inside the head,
    wherein the second part is at least rotationally movable with respect to the first part about an axis of rotation, wherein the axis of rotation is configured to be tilted with respect to a longitudinal axis of the support pole,
    wherein the body has a sphere shape which is truncated by a junction surface from the second part to the first part which is substantially planar,
    wherein the junction surface is tilted with respect to a longitudinal axis of the support pole, and/or wherein the longitudinal axis of the port is tilted with respect to the junction surface.

2. The head according to claim 1, wherein the second part comprises a hemisphere and the second part comprises a hemisphere, and/or wherein the connecting end piece has a cylindrical shape.

3. The head according to claim 1, wherein the port is delimited by a surface of revolution.

4. The head according to claim 1, wherein the port opens into the housing substantially at the centre of the head and/or wherein the port constitutes the housing for the instrument.

5. The head according to claim 1, wherein the longitudinal axis of the port is configured to intersect the longitudinal axis of the support pole and/or wherein an axis perpendicular to the junction surface is configured to be tilted with respect to the longitudinal axis of the support pole.

6. The head according to claim 1, wherein the longitudinal axis of the port is configured to be tilted with respect to the junction surface by an angle which is between 25 and 155°, and/or
    wherein the junction surface is configured to be tilted with respect to the longitudinal axis of the support pole by an angle which is between 25° and 155°.

7. The head according to claim 1, wherein the first part and/or the second part comprises a shielding material against radioactive radiation such as X-radiation and/or gamma radiation, and/or a thermal, chemical, bacteriological, electrical and/or magnetic insulation material.

8. An apparatus comprising a head according to claim 1, a support pole and an actuator configured to move the second part relative to the first part.

9. The apparatus according to claim 8, wherein the actuator comprises a drive shaft, wherein the longitudinal axis of the drive shaft is to be parallel to the longitudinal axis of the support pole.

10. The apparatus according to claim 8, wherein the actuator comprises a transmission device, wherein the transmission device comprising an angle transmission gear.

11. The apparatus according to claim 8, wherein the actuator comprises a transmission device, wherein the transmission device comprises a first transmission element and a second transmission element,
    wherein the first transmission element is housed in the first part, and/or wherein the second transmission element is rigidly integral with the second part.

12. The apparatus according to claim 8, comprising a device for controlling the position of the port relative to the longitudinal axis of the support pole.

13. A control equipment, comprising:
    a head according to claim 1 or an apparatus according to claim 7, wherein the apparatus is especially a collimation apparatus, and
    a measurement instrument which is housed in the housing of the head, wherein the measurement instrument comprises a detector.

14. The control equipment according to claim 13, wherein the detector extends inside the head, so that the longitudinal axis of the detector is parallel to the longitudinal axis of the support pole, and/or
    wherein the control equipment comprises a power supply or signal transmission means for the detector, which extends inside the head substantially along the longitudinal axis of the support pole.

15. A method for manufacturing a head according to claim 1, wherein the head is made of at least a first material and a second material, wherein the first material is stronger mechanically than the second material and wherein the first material is located around the second material,
    the manufacturing method comprising a step of manufacturing an external skin of the head from the first material.

16. The manufacturing method according to claim 15, wherein the second material is a shielding material against radioactive radiation, such as X-radiation and/or gamma radiation.

17. A method for manufacturing an apparatus according to claim 8, wherein the head is made of at least a first material and a second material, wherein the first material is stronger mechanically than the second material and wherein the first material is located around the second material,
    the manufacturing method comprising a step of manufacturing an external skin (52) of the head from the first material.

18. The manufacturing method according to claim 17, wherein the second material is a shielding material against radioactive radiation, such as X-radiation and/or gamma radiation.

* * * * *